United States Patent
Fujita et al.

(10) Patent No.: US 9,732,720 B2
(45) Date of Patent: Aug. 15, 2017

(54) ENGINE STARTING APPARATUS

(71) Applicant: DENSO CORPORATION, Kariya, Aichi (JP)

(72) Inventors: Tatsuya Fujita, Obu (JP); Kouichi Oosawa, Anjo (JP); Mitsuhiro Murata, Niwa-gun (JP)

(73) Assignee: DENSO CORPORATION, Kariya (JP)

( * ) Notice: Subject to any disclaimer, the term of this patent is extended or adjusted under 35 U.S.C. 154(b) by 101 days.

(21) Appl. No.: 14/575,515

(22) Filed: Dec. 18, 2014

(65) Prior Publication Data
US 2015/0167617 A1 Jun. 18, 2015

(30) Foreign Application Priority Data

Dec. 18, 2013 (JP) .................................. 2013-261094

(51) Int. Cl.
*F02N 11/08* (2006.01)
*B60W 30/18* (2012.01)

(52) U.S. Cl.
CPC ... *F02N 11/0859* (2013.01); *B60W 30/18027* (2013.01); *F02N 11/08* (2013.01); *F02N 11/0848* (2013.01); *F02N 2200/101* (2013.01); *F02N 2200/102* (2013.01)

(58) Field of Classification Search
CPC .. F02N 11/08; F02N 11/0811; F02N 11/0822; F02N 11/0844; F02N 11/0848; F02N 11/0859; F02N 2200/022; F02N 2200/101; F02N 2200/102; B60W 10/08; B60W 30/18027

USPC ............... 123/179.3, 179.4, 198 D; 701/113; 290/38 R

See application file for complete search history.

(56) References Cited

U.S. PATENT DOCUMENTS

| | | | | | |
|---|---|---|---|---|---|
| 4,022,164 | A | * | 5/1977 | Fuchs | F02B 75/12 123/179.3 |
| 4,402,286 | A | * | 9/1983 | Pagel | F02N 11/0814 123/179.3 |
| 4,490,620 | A | * | 12/1984 | Hansen | F02N 11/0848 123/179.3 |
| 4,630,577 | A | * | 12/1986 | Cornacchia | B60W 30/18018 123/179.3 |

(Continued)

FOREIGN PATENT DOCUMENTS

| | | |
|---|---|---|
| JP | A-2002-188549 | 7/2002 |
| JP | 2004108327 A * | 4/2004 |
| JP | A-2008-190496 | 8/2008 |

*Primary Examiner* — Mahmoud Gimie
*Assistant Examiner* — John Zaleskas
(74) *Attorney, Agent, or Firm* — Oliff PLC

(57) ABSTRACT

In an engine starting apparatus, a starter control unit is configured to, upon command to start the engine, put a starter in a drive ON state to begin cranking of the engine and then put the starter in a drive OFF state at a predetermined timing. The starter control unit is configured to, when acceleration is requested within a predetermined time period from the command to start the engine, keep the starter in the drive ON state even after the time when the starter would be put in the drive OFF state without the acceleration request within the predetermined time period, and drive the starter to torque-assist the engine, thereby performing an assist mode in which both the engine) and the starter serve as drive sources for driving a vehicle.

8 Claims, 5 Drawing Sheets

(56) References Cited

U.S. PATENT DOCUMENTS

| | | | | |
|---|---|---|---|---|
| 4,721,083 A * | 1/1988 | Hosaka | F02D 41/083 | 123/179.3 |
| 5,818,115 A * | 10/1998 | Nagao | F02N 11/04 | 180/65.1 |
| 6,357,409 B1 * | 3/2002 | Haghgooie | F01L 9/04 | 123/179.3 |
| 6,390,214 B1 * | 5/2002 | Takahashi | B60K 6/485 | 180/65.26 |
| 6,800,953 B2 * | 10/2004 | Blackburn | F02N 11/04 | 290/31 |
| 7,578,364 B2 * | 8/2009 | Ohno | B60K 6/365 | 180/65.265 |
| 7,677,215 B2 * | 3/2010 | Yamaguchi | F02N 11/0848 | 123/179.3 |
| 7,878,173 B2 * | 2/2011 | Kishibata | B63H 21/14 | 123/319 |
| 8,281,760 B2 * | 10/2012 | Bolander | F02N 11/0848 | 123/179.3 |
| 2004/0000281 A1 * | 1/2004 | Wakitani | F02N 11/0848 | 123/179.3 |
| 2004/0000882 A1 * | 1/2004 | Wakitani | F02N 11/04 | 318/66 |
| 2004/0121882 A1 * | 6/2004 | Tajima | B60K 6/485 | 477/3 |
| 2004/0123587 A1 * | 7/2004 | Kamiya | F02D 41/0235 | 60/284 |
| 2005/0022770 A1 * | 2/2005 | Yumiyama | F02N 15/026 | 123/179.4 |
| 2005/0051371 A1 * | 3/2005 | Masterson | B60K 6/48 | 180/65.25 |
| 2005/0263121 A1 * | 12/2005 | Tamagawa | F02N 11/08 | 123/179.3 |
| 2007/0028880 A1 * | 2/2007 | Yuya | F02N 11/08 | 123/179.3 |
| 2010/0024756 A1 * | 2/2010 | Seufert | B60K 6/387 | 123/179.3 |
| 2010/0031910 A1 * | 2/2010 | Seufert | B60K 6/387 | 123/179.3 |
| 2010/0050970 A1 * | 3/2010 | Okumoto | F02N 11/0844 | 123/179.4 |
| 2010/0222973 A1 * | 9/2010 | Senda | B60W 10/02 | 701/54 |
| 2012/0071298 A1 * | 3/2012 | Morita | F02N 11/0822 | 477/167 |
| 2012/0173099 A1 * | 7/2012 | Juhlin-Dannfelt | B60W 30/18027 | 701/53 |
| 2012/0304818 A1 * | 12/2012 | Moriya | F02N 11/0844 | 74/7 A |
| 2014/0116380 A1 * | 5/2014 | Puri | F02N 11/08 | 123/350 |

* cited by examiner

ENGINE STARTING APPARATUS

CROSS-REFERENCE TO RELATED APPLICATION

This application is based on and claims the benefit of priority from earlier Japanese Patent Application No. 2013-261094 filed Dec. 18, 2013, the description of which is incorporated herein by reference.

BACKGROUND

Technical Field

The present invention relates to an engine starter.

Related Art

A known technique for improving fuel economy of a vehicle is configured to torque-assist an engine via a motor so that both the engine and the motor serve as drive sources for driving the vehicle. Conventionally, a motor generator (MG) is used as such a motor.

However, the MG is an alternating-current (AC) motor, which suffers from disadvantages that the acceleration of the vehicle immediately after the start-up of the engine is delayed until detection of a rotational position of a rotor and that manufacturing costs are increased.

Therefore, it is desirable to have a technique for improving acceleration responsiveness immediately after the start-up of the engine.

An inexpensive vehicle-mounted motor including, but not limited to, a direct-current (DC) starter, may be used as a torque-assist motor.

Such a starter, however, suffers from discomfort caused by noise associated with driving the starter, such as an engagement sound between a ring gear and a pinion, and degradation of a drive-train between the starter and the engine, such as wear of the ring gear and the pinion. Thus, use of such a starter as a torque-assist motor needs overcoming these disadvantages.

Japanese Patent Application Laid-Open Publication No. 2008-190496 discloses a technique that enables evasive running of a vehicle via a starter using a DC motor, however, does not teach or suggest use of the starter for torque-assisting an engine. Japanese Patent Application Laid-Open Publication No. 2002-188549 discloses a starter capable of rotating up to speeds above an idle speed of an engine, however, does not teach or suggest use of the starter for torque-assisting an engine, either.

In consideration of the foregoing, exemplary embodiments of the present invention are directed to providing an engine starting apparatus capable of torque-assisting an engine via an inexpensive direct-current (DC) starter.

SUMMARY

In accordance with an exemplary embodiment of the present invention, there is provided an engine starting apparatus including: a starter having a direct-current (DC) motor that generates rotational force, the starter being configured to transfer the rotational force of the DC motor to a crankshaft of an engine; and a starter control unit configured to control driving of the starter.

The starter control unit is configured to, upon command to start the engine, put the starter in a drive ON state to begin cranking of the engine and then put the starter in a drive OFF state at a predetermined timing. The drive ON state is a state of the starter such that the motor is energized and the rotational force of the motor is transferred to the crankshaft. The drive OFF state is a state of the starter such that the rotational force of the motor is not transferred to the crankshaft.

The starter control unit is configured to, when acceleration is requested within a predetermined time period from the command to start the engine, keep the starter in the drive ON state even after the time when the starter would be put in the drive OFF state without the acceleration request within the predetermined time period, and drive the starter to torque-assist the engine, thereby performing an assist mode in which both the engine and the starter serve as drive sources for driving a vehicle.

With the above configuration, during low speed traveling of a vehicle, the starter is used to torque-assist the engine only when acceleration is requested during driving of the starter whilst, conventionally, the MG is used to torque-assist the engine even during the low speed traveling.

That is, in the present invention, for example, when the acceleration is requested after the drive-chain between the starter and the engine is de-engaged upon termination of cranking of the engine, the starter is not used to torque-assist the engine.

This can reduce a use frequency at which the starter is used to torque-assist the engine. Such a reduced use frequency of the starter for torque-assisting the engine can prevent degradation of the drive-train between the starter and the crankshaft. For example, the drive-train between the starter and the crankshaft includes a gear mesh between the pinion and the ring gear, which may cause gear wear between the pinion and the ring gear. However, with the above configuration, limited use of the starter to torque-assist the engine may lead to a reduced use frequency of the starter. This can prevent such gear wear.

In addition, the starter is used to torque-assist the engine only when the vehicle is in an accelerating state, which can reduce discomfort cause by noise associated with driving the starter. This comes from the fact that the noise associated with driving the starter is less noticeable by occupants of the vehicle because the overall noise during accelerating of the vehicle is greater in magnitude than the noise during steady state traveling of the vehicle.

Thus, the above configuration can prevent the degradation of the drive-train and the discomfort caused by the noise associated with driving the starter, and allows an inexpensive DC starter to be used to torque-assist the engine.

DESCRIPTION OF SPECIFIC EMBODIMENTS

The present invention will be described more fully hereinafter with reference to the accompanying drawings. Like numbers refer to like elements throughout.

(First Embodiment)

(Configuration)

Figure 1:
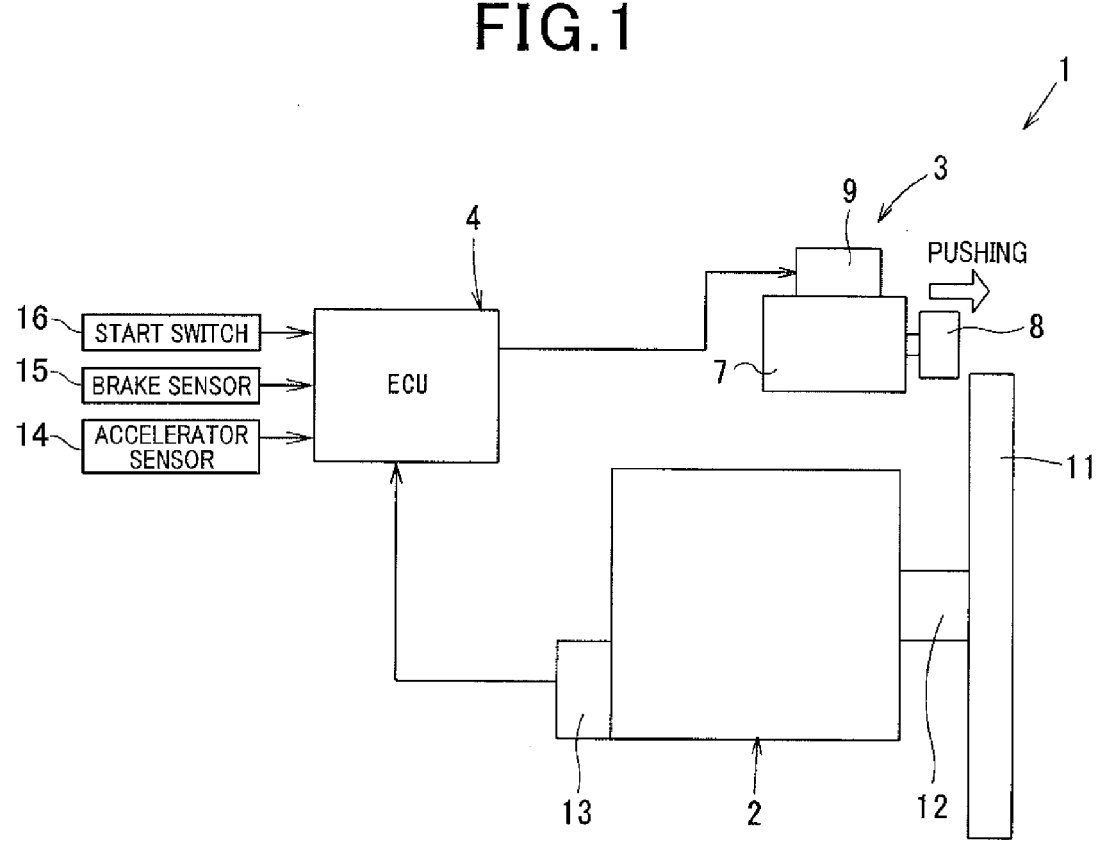
FIG. 1 is a schematic diagram of an engine starting apparatus in accordance with a first embodiment of the present invention.

There will now be explained a first embodiment with reference to FIGS. 1-3. An engine starting apparatus 1 of the first embodiment is adapted for a vehicle with an idle-stop system for automatically controlling stopping and restarting of an engine, and includes a starter 3 configured to start the engine 2 and an electronic control unit (ECU) 4 configured to control operations of the starter 3.

The starter 3 is an inertia-engagement-type starter capable of rotating up to speeds above an idle speed of the engine 2 and includes a motor 7, a pinion 8, an electromagnetic switch 9 and others.

The motor 7 is a direct-current (DC) commutator motor that includes a field (not shown) formed of permanent magnets (or field coils) disposed on an inner circumference of a yoke also serving as a frame, an armature having a commutator (not shown) disposed on an outer circumference of an armature axis, and brushes (not shown) disposed on an outer circumference of the commutator. The motor 7 is capable of rotating up to speeds above the idle speed.

The pinion 8, which is a small gear disposed on an output shaft of the motor 7, meshes with a ring gear 11 to transfer rotational force of the motor 7 to a crankshaft 12 of the engine 2 connected to the ring gear 11.

The starter 3 includes a one-way clutch (not shown) not only for transferring the rotational force of the motor 7 to the pinion 8, but also for isolating the transfer of rotational force from the pinion 8 to the motor 7. The one-way clutch is configured to isolate the transfer of the rotational force from the pinion 8 to the motor 7 when the rotational speed of the ring gear 11 exceeds the rotational speed of the motor 7.

The electromagnetic switch 9 not only serves as pinion pushing means for pushing the pinion 8 toward the ring gear 11 via a shift lever (not shown), but also as a motor switch for powering on and off the motor 7.

The electronic control unit (ECU) 4 serves as a starter control unit configured to control energization of the starter 3 based on signals from an engine speed sensor 13 for detecting an engine speed, an accelerator sensor 14, a brake sensor 15, and a start switch 16 and the like.

Upon command to start the engine 2, the electronic control unit (ECU) 4 puts the starter 3 in a drive ON state to start the engine 2.

The drive ON state refers to a state such that the motor 7 is energized and the rotational force of the motor 7 is transmitted to a crankshaft 12. That is, in the present embodiment, the driving ON state is a state such that the pinion 8 is in engagement with the ring gear 11 after being pushed toward the ring gear 11 and the motor 7 is in an energized state.

The command to start the engine 2 may be signaled to the ECU (starter control unit) 4 as a signal from the start switch 16 that the start switch 16 has been turned on while the engine 2 is stopped. Such a signal is hereinafter referred to as a start command.

In a vehicle with the idle-stop system mounted therein, the engine is restarted when idle stop (or idle shut down) is exited by deactivating the brake. Therefore, the command to start the engine 2 may also be signaled to the ECU (starter control unit) 4 as a detection signal from the brake sensor 15 that the brake has been deactivated. The ECU 4 is also commanded to restart the engine 2 when the brake is deactivated during slowing to an automatic stop of the engine 2.

(Process of Controlling the Starter)

The starter control unit is configured to, when acceleration is requested within a predetermined time period Ta from the command to start the engine, perform an assist mode in which the starter control unit controls the starter 3 to torque-assist the engine 2. In the assist mode, both the engine 2 and the starter 3 serve as drive sources for driving the vehicle.

A process of controlling the starter 3 performed after the command to start the engine will now be explained with reference to FIGS. 2 and 3.

Figure 2:
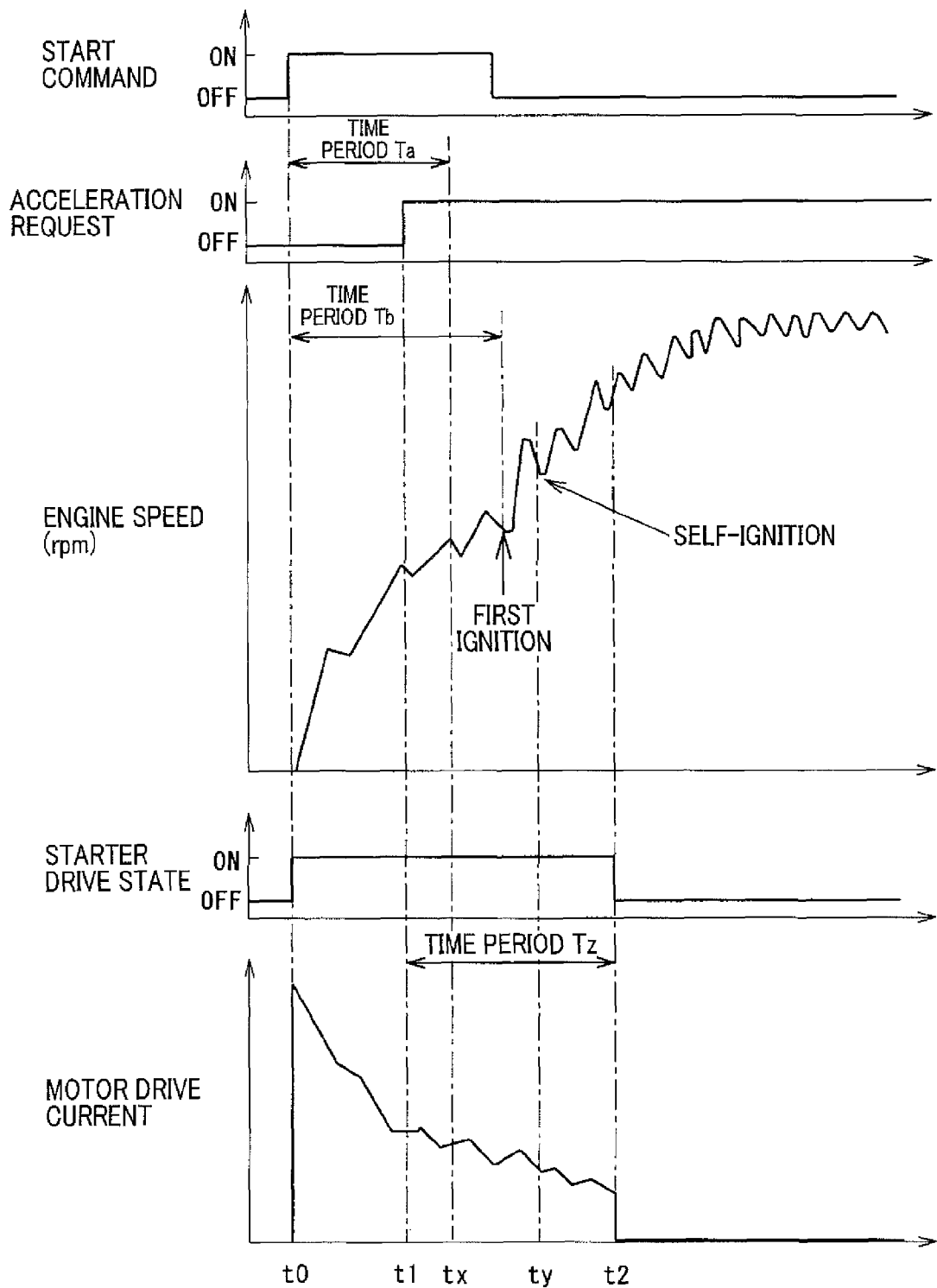
FIG. 2 is a schematic timing diagram of a start command, an acceleration request, an engine speed, a starter drive state, a motor drive current, in accordance with the first embodiment.

FIG. 2 shows a timing diagram for the process of controlling the starter 3 performed when the start command (signal) becomes ON while the engine (2) is stopped. Although not shown, a similar process of controlling the starter 3 may be performed upon command to restart the engine (or the start command becomes ON) during slowing to an automatic stop of the engine 2.

The start command becomes ON (see FIG. 2) when the start switch 16 is turned on or the brake is deactivated for exiting the idle stop.

When the start command becomes ON, the starter 3 is put in the drive ON state, that is, the pinion 8 is pushed toward the ring gear 11 by energizing the electromagnetic switch 9 so as to mesh with the ring gear 11 and energization of the motor 7 is initiated. This allows rotational force of the motor 7 to be transferred to the crankshaft 12.

Figure 3:
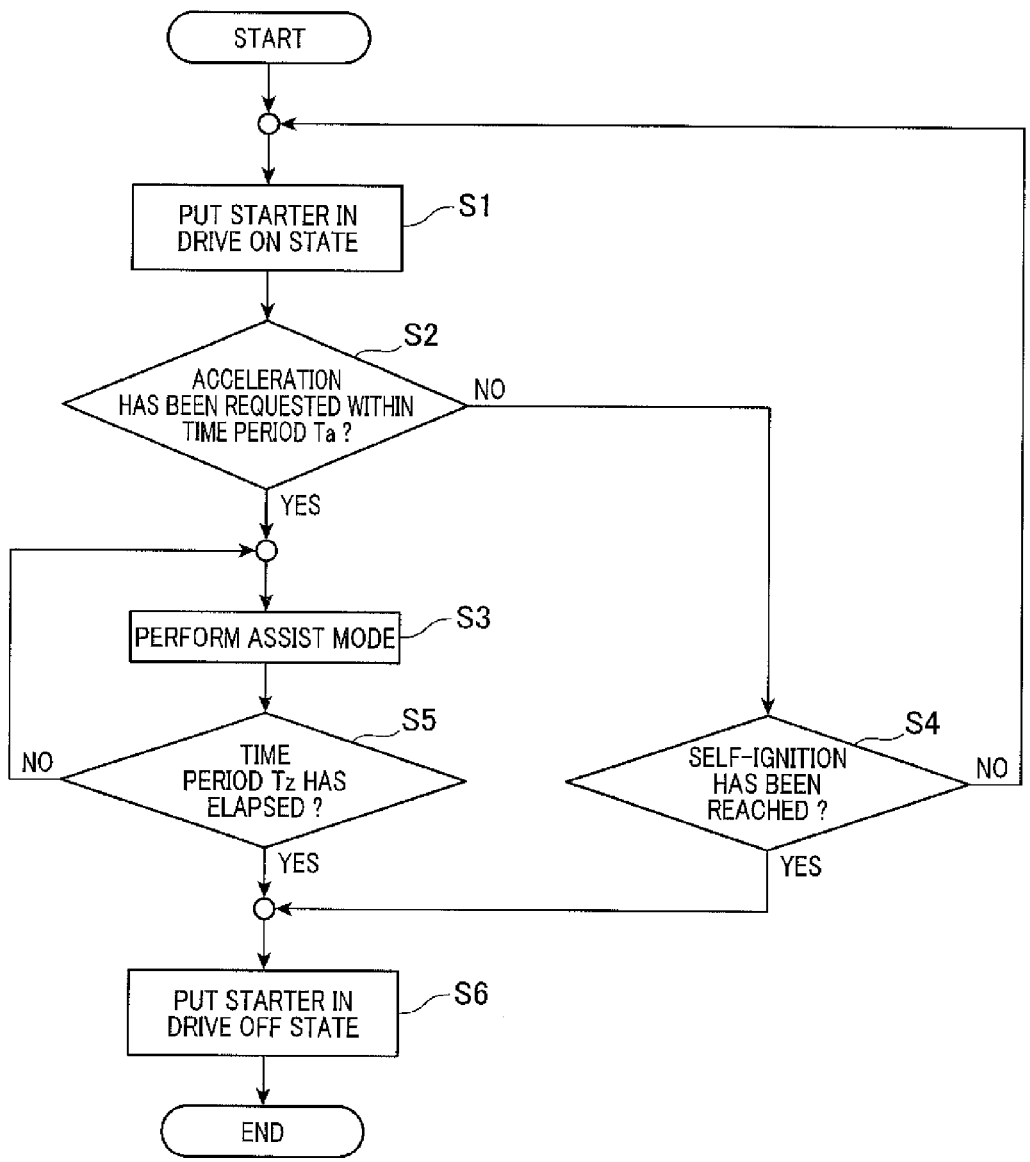
FIG. 3 is a flowchart of a starter control process in accordance with the first embodiment.

If, during the drive ON state of the starter 3, the acceleration is requested within a time period Ta from time to, at which the start command becomes ON, to time tx (see FIG. 2), then an assist mode is performed (see steps S1-S3 in FIG. 3).

As above, in step S2, it is determined whether or not the acceleration has been requested until time tx, that is, it is determined whether or not the acceleration has been requested within the predetermined time period Ta from the transition of the start command from OFF to ON. The request for acceleration may be signaled to the ECU (starter control unit) 4 as a signal from the accelerator sensor 14 that an accelerator pedal has been depressed. Such a signal is hereinafter referred to as an acceleration request. That is, the acceleration request (signal) transitions from OFF to ON when depression of an accelerator pedal is detected by the accelerator sensor 14. The acceleration request may become ON when a depression speed of the accelerator pedal or a change rate of accelerator opening degree becomes equal to or greater than a predetermined value.

As shown in FIG. 2, as an example, the acceleration request (signal) transitions from OFF to ON at time t1 which is before time tx. Therefore, it is determined that the acceleration has been requested within the predetermined time period Ta. Thereafter, the process proceeds to step S3, where an assist mode is performed. In the assist mode, the starter 3 is kept in the drive ON state and the rotational force of the motor 7 is continuously transmitted to the crankshaft 12 whether or not the self-ignition of the engine 2 is achieved. Thus, in the assist mode, the engine 2 is torque-assisted by the starter 3 and both the engine 2 and the starter 3 serve as drive sources for driving the vehicle.

In the present embodiment, as shown in FIG. 2, the predetermined time period Ta is set less than a time period Tb from the transition of the start command from OFF to ON to first ignition of the engine 2.

It is determined in step S2 that the acceleration has not been requested within the predetermined time period Ta, then the process proceeds to step S4, where it is determined whether or not the self-ignition of the engine 2 has been achieved. If it is determined that the self-ignition of the engine 2 has been achieved, then the starter 3 is put in the drive OFF state. If it is determined that the self-ignition of the engine 2 has not been achieved, then the starter 3 is kept in the drive ON state and the process returns to step S1.

The drive OFF state of the starter 3 is a state such that the rotational force of the motor 7 is not transferred to the crankshaft 12 and the direct-current (DC) motor is in a de-energized state or the pinion 8 is de-engaged from the ring gear 11.

In the present embodiment, in a normal mode of the starter 3 (i.e., if the acceleration has not been requested within the predetermined time period Ta from the transition of the start command from OFF to ON), the starter 3 is powered off at time ty. At time ty, it is determined in step S4 that the self-ignition is achieved (see FIG. 2).

If the acceleration has been requested within the predetermined time period Ta from the transition of the start command from OFF to ON, the starter 3 is kept in the drive ON state even after time ty without being put in the drive OFF state at time ty.

In the case of the common low speed starter, the engine speed exceeds a rotational speed of the motor when the self-ignition of the engine 3 is achieved, which allows the one-way clutch to be de-engaged. In the present embodiment, the motor 7 of the starter 3 is capable of rotating at a high speed. Therefore, the one-way clutch is kept engaged even after the self-ignition is achieved and the rotational force of the motor 7 continues to be transmitted to the engine 3.

In step S5, it is determined whether or not the predetermined time period Tz has elapsed from the transition of the acceleration request from OFF to ON. If it is determined that the predetermined time period Tz has elapsed from the transition of the acceleration request from OFF to ON, then the starter 3 is put in the drive OFF state in step S6. If it is determined that the predetermined time period Tz has not yet elapsed from the transition of the acceleration request from OFF to ON, then the process returns to step S3.

In the present embodiment, the starter 3 is put in the drive OFF state at time t2. At time t2, a time period Tz elapses from time t1, at which the acceleration request transitions from OFF to ON. The time period Tz is set such that time t2 is preceded by time ty.

As above, in the present embodiment, the end of duration of the drive ON state of the starter 3, at which the assist mode is exited, is determined by an elapsed time from the transition of the acceleration request from OFF to ON.

(Advantages)

In the present embodiment, the starter 3 is used to torque-assist the engine 2 only when the acceleration is requested during driving of the starter 3, more specifically, only when the acceleration is requested within the predetermined time period Ta from the command to start the engine.

In such a configuration as above, the starter 3 is not used to torque-assist the engine 2 during low speed traveling or the like whilst the MG is used to torque-assist the engine even during the low speed traveling. This can reduce a use frequency at which the starter 3 is used to torque-assist the engine 2.

Such a reduced use frequency of the starter 3 for torque-assisting the engine 2 can prevent degradation of the drive-train between the starter 3 and the crankshaft 12.

In the present embodiment, the drive-train between the starter 3 and the crankshaft 12 includes a gear mesh between the pinion 8 and the ring gear 11 as in the present embodiment, which may cause gear wear between the pinion 8 and the ring gear 11. However, in the present embodiment, limited use of the starter 3 to torque-assist the engine may lead to a reduced use frequency of the starter 3. This can prevent such gear wear.

The starter 3 is used to torque-assist the engine 2 only when the vehicle is in an an accelerating state, which can reduce discomfort cause by noise associated with driving the starter 3. This comes from the fact that the noise associated with driving the starter 3 is less noticeable by a driver and other occupants of the vehicle because the overall noise during accelerating of the vehicle is greater in magnitude than the noise during steady state traveling of the vehicle.

The motor 7 of the starter 3 is a direct-current (DC) motor having good responsiveness. Therefore, the assistance of the starter 3 can improve the responsiveness as compared with the assistance of the MG.

Thus, the present embodiment can prevent the degradation of the drive-train and the discomfort caused by the noise associated with driving the starter 3, and allows the inexpensive DC starter 3 to be used to torque-assist the engine 2.

(Second Embodiment)

An engine starting apparatus 1 in accordance with a second embodiment of the present invention will now be explained with reference to FIGS. 4 and 5. Only differences of the second embodiment from the first embodiment will be explained. Elements having the same functions as in the first embodiment are assigned the same numbers and will not be described again for brevity. In the present embodiment, the end of duration of the drive ON state of the starter 3 is determined based on the engine speed.

The process of controlling the starter 3 includes, in place of step S5 of the first embodiment, step S5a where it is determined whether or not the engine speed detected by the engine speed sensor 13 has reached a predetermined engine speed Na.

If it is determined that the engine speed detected by the engine speed sensor 13 has reached the predetermined engine speed Na, then the starter 3 is put in the drive OFF state.

Figure 4:
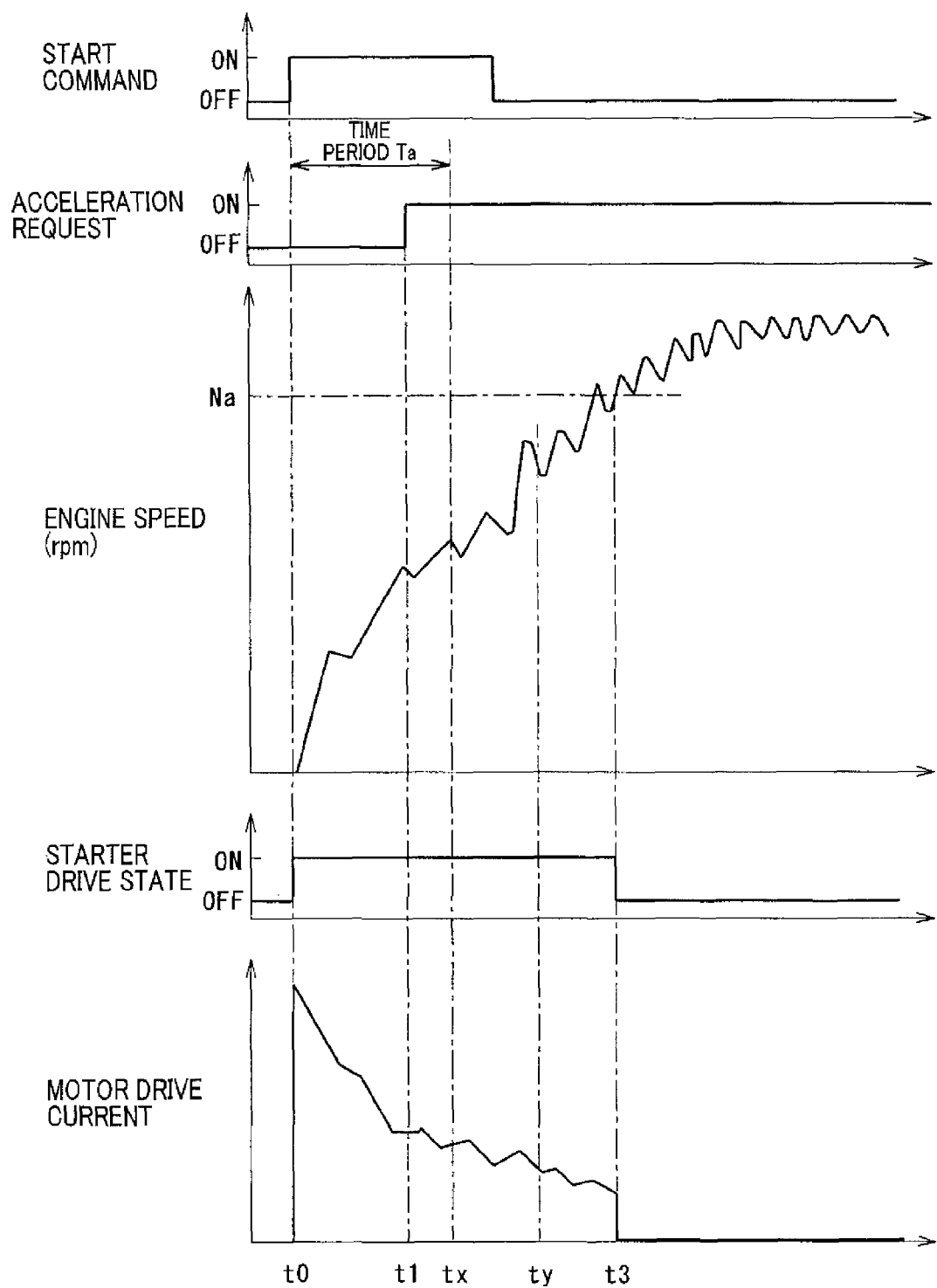
FIG. 4 is a schematic timing diagram of a start command, an acceleration request, an engine speed, a starter drive state, a motor drive current, in accordance with a second embodiment of the present invention.
Figure 5:
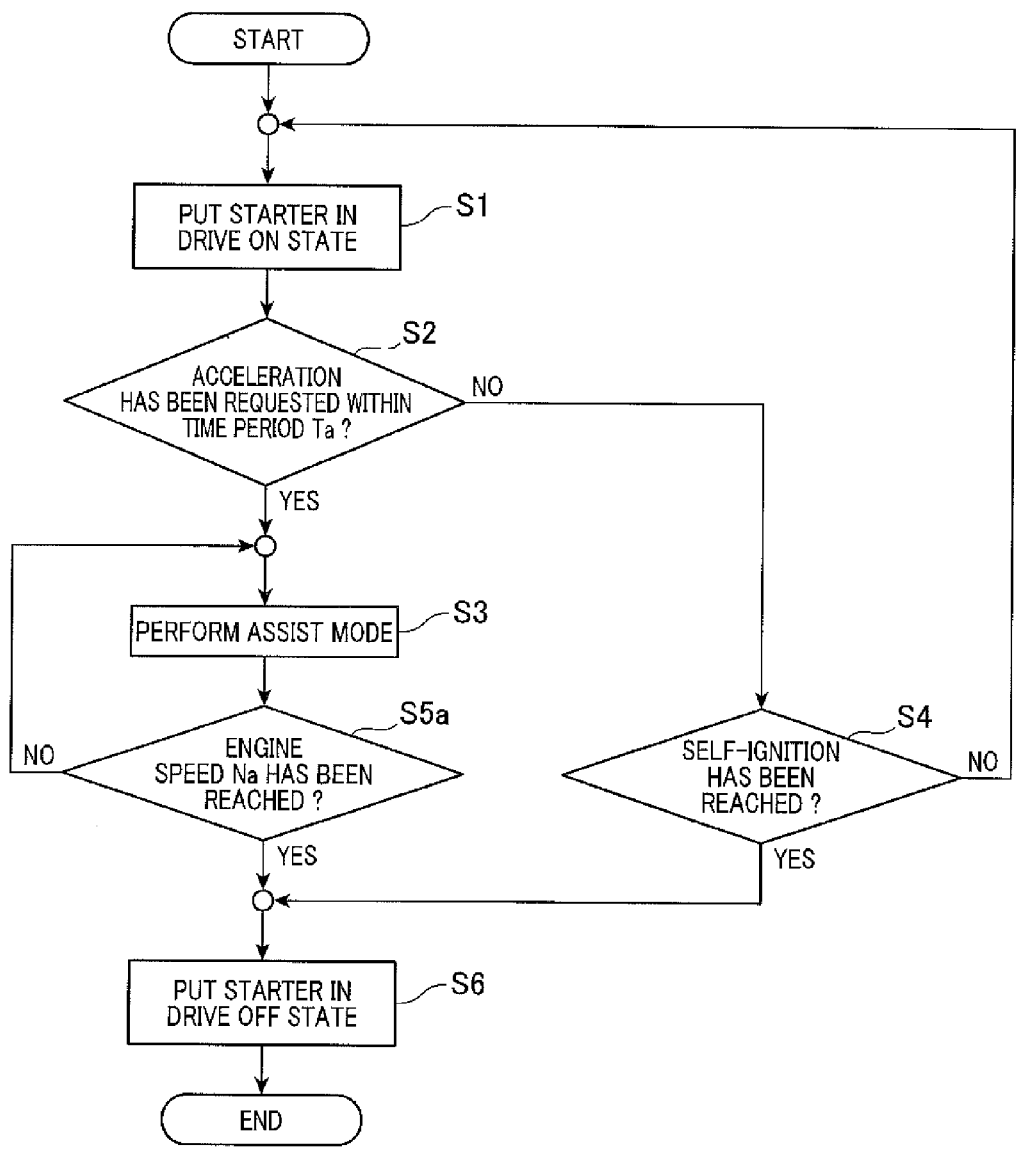
FIG. 5 is a flowchart of a starter control process in accordance with the second embodiment.

As shown in FIG. 4, at time t3, the predetermined engine speed Na is reached and the starter 3 is put in the drive OFF state.

The predetermined engine speed Na may be a predetermined idle speed or an engine speed calculated in the ECU 4 as a function of a degree of the acceleration request.

The same effects are achieved in the second embodiment as in the first embodiment.

(Modifications)

In the electromagnetic switch 9, a solenoid for pushing the pinion 8 toward the ring gear 11 and a solenoid for turning on and off energization current of the motor 7 may be the same or distinct from each other.

In the above embodiments, the starter 3 is an inertia-engagement-type starter. Alternatively, the starter 3 may be a constant mesh starter, wherein the pinion and the ring gear constantly mesh with each other.

In the above embodiments, the starter 3 includes a one-way clutch. Alternatively, the starter 3 does not include any one-way clutch.

In the first embodiment, the starter 3 is, in the normal mode, put in the drive OFF state at time ty where the self-ignition is achieved, and, in the torque-assist mode, put in the drive OFF state at time t2 that is after time ty. Alternatively, the transition of the starter 3 to the drive OFF state in the torque-assist mode may be after the transition of the starter 3 to the drive OFF state in the normal mode, and the transition of the starter 3 to the drive OFF state in the normal mode may be after time ty where the self-ignition is achieved.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An engine starting apparatus comprising:
   an inertia-engagement-type starter including a direct-current (DC) motor that generates rotational force, a pinion, and an electromagnetic switch, the starter being configured to, after the electromagnetic switch is turned on, transfer the rotational force of the DC motor to a crankshaft of an engine via a gear mesh between the pinion and a ring gear of the engine; and
   a starter control unit configured to control driving of the starter, the starter control unit being configured to, upon command to start the engine, put the starter in a drive ON state to begin cranking of the engine and then put the starter in a drive OFF state at a predetermined timing, the drive ON state being a state of the starter such that the motor is energized and the rotational force of the motor is transferred to the crankshaft via the gear mesh between the pinion and the ring gear, and the drive OFF state being a state of the starter such that the rotational force of the motor is not transferred to the crankshaft via demesh of the pinion from the ring gear or via de-energization of the motor, wherein
   the starter control unit is configured to, only when acceleration is requested within a predetermined time period from the command to start the engine during the drive ON state of the starter, keep the starter in the drive ON state even after the time when the starter would be put in the drive OFF state without the acceleration request within the predetermined time period, and drive the starter to torque-assist the engine, thereby performing an assist mode in which both the engine and the starter serve as drive sources for driving a vehicle, and
   the predetermined time period is less than a time period from the command to start the engine to first ignition of the engine.

2. The apparatus of claim 1, wherein the command to start the engine is for starting the engine while the engine is stopped.

3. The apparatus of claim 2, wherein the command to start the engine is signaled to the starter control unit when a start switch is turned on.

4. The apparatus of claim 1, wherein
   the apparatus is applied to a vehicle with an idle-stop system for automatically controlling stopping and restarting of the engine, and
   the command to start the engine is for restarting the engine during slowing to an automatic stop of the engine.

5. The apparatus of claim 4, wherein the command to start the engine is signaled to the starter control unit when a brake is deactivated.

6. The apparatus of claim 1, wherein
   the starter control unit is configured to set the end of duration of the drive ON state of the starter to the time when a predetermined amount of time elapses from when the acceleration is requested within the predetermined time period.

7. The apparatus of claim 1, wherein
   the starter control unit is configured to set the end of duration of the drive ON state of the starter to the time when an engine speed of the engine reaches a predetermined engine speed.

8. The apparatus of claim 7, wherein the predetermined engine speed is a predetermined idle speed of the engine.

* * * * *